June 1, 1965 W. W. BLASE 3,187,131
PRESSURE AND TEMPERATURE OPERATED MAGNETIC SNAP-ACTION SWITCH
Filed June 26, 1962 4 Sheets-Sheet 1

WILLIAM W. BLASE
INVENTOR

BY Richard J. Stephens
ATTORNEY

June 1, 1965          W. W. BLASE          3,187,131

PRESSURE AND TEMPERATURE OPERATED MAGNETIC SNAP-ACTION SWITCH

Filed June 26, 1962          4 Sheets-Sheet 2

WILLIAM W. BLASE
INVENTOR

BY *Richard J. Stephens*
ATTORNEY

June 1, 1965 W. W. BLASE 3,187,131
PRESSURE AND TEMPERATURE OPERATED MAGNETIC SNAP-ACTION SWITCH
Filed June 26, 1962 4 Sheets-Sheet 3

WILLIAM W. BLASE
INVENTOR

BY Richard L. Stephens
ATTORNEY

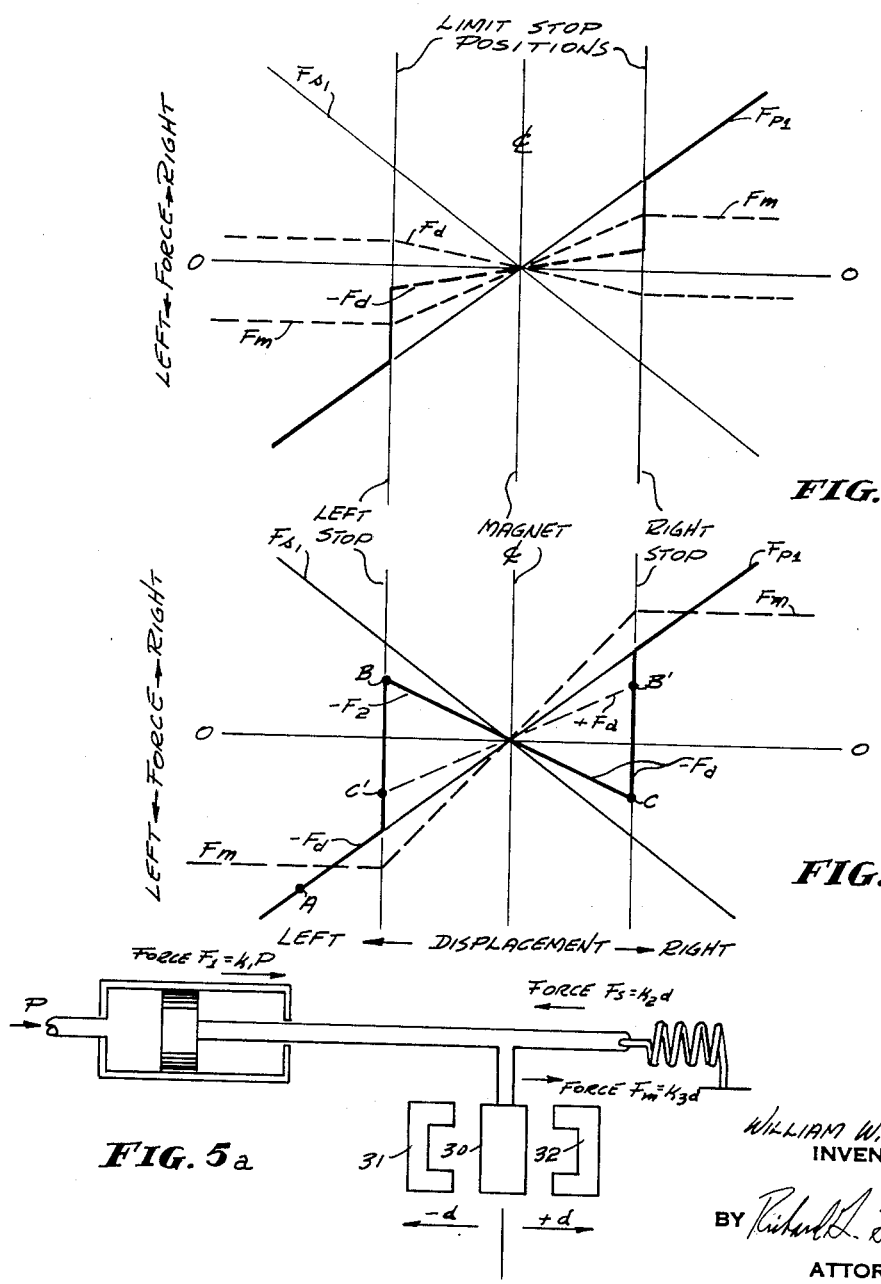

United States Patent Office 3,187,131
Patented June 1, 1965

3,187,131
PRESSURE AND TEMPERATURE OPERATED MAGNETIC SNAP-ACTION SWITCH
William W. Blase, Chicago, Ill., assignor to G.P.E. Controls, Inc., Chicago, Ill., a corporation of Illinois
Filed June 26, 1962, Ser. No. 205,252
7 Claims. (Cl. 200—67)

This invention relates to adjustable electrical switches, and more particularly, to improved pressure-operated and temperature-operated switches which may be accurately adjusted to switch at desired pressure or temperatures. A wide variety of automatic control and instrumentation applications require electrical switches responsive to temperature and/or pressure which may be adjusted to make or break at precise temperatures or pressures, to control or protect various mechanisms and processes. Control of electrical switches in response to fluid pressures commonly has been accomplished in the prior art by means of Bourdon tubes or bellows or like devices which are mechanically connected to operate a switch, which frequently is provided with an overcenter mechanism to provide "snap-action" when the Bourdon tube moves a switch element in either direction past an actuating point. If a Bourdon tube is required to withstand high pressures it necessarily is provided with a high spring rate, which means that it moves very slightly for a given pressure change. Because such small motions are involved, it has been difficult to construct pressure-operated switches which always transfer accurately, at a desired pressure. While it is possible, of course, to amplify Bourdon tube or bellows movement by means of levers and like devices, the use of such devices commonly interposes backlash and friction between the Bourdon tube or bellows and the switch, interfering with accurate switch operation. Similar problems attend the operation of switches by temperature-sensing elements such as bi-metal elements.

The central concept of the instant invention involves the provision of bi-directionally-acting magnetic means mechanically connected to the condition-sensing transducer and operative effectively to reduce the transducer spring rate, so that a given pressure change or temperature change will result in substantially greater movement of the condition-sensing transducer and thereby facilitate accurate and positive actuation of an electrical switch by the transducer. The bi-directionally-acting magnetic means in themselves also have an unstable equilibrium characteristic which may be used to provide or enhance the snap-action switch operation usually desired, so that the snap-action mechanisms heretofore used in such switches may be simplified, and in many cases, eliminated altogether.

Thus it is a primary object of the present invention to provide an improved condition-sensing switch assembly having magnetic means operable to decrease the spring rate of a condition sensing-to-mechanical displacement transducer which is mechanically connected to operate an electrical switch.

FIGS. 5a, 5b and 5c are an equivalent circuit diagram and two graphs useful in understanding operation of the invention.

Figure 1:
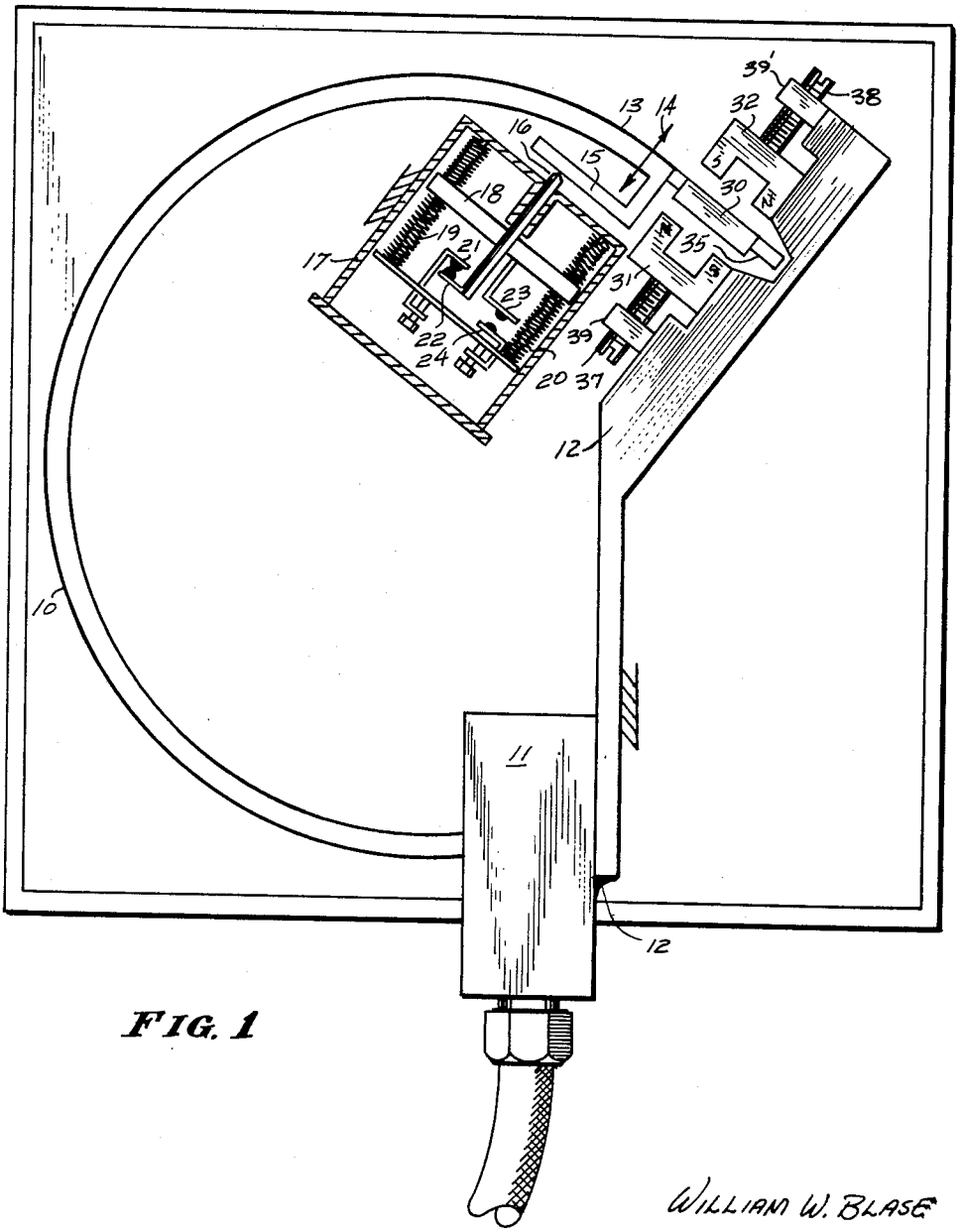
FIG. 1 is a schematic diagram of a pressure-sensing embodiment of the invention.

In FIG. 1 the pressure-sensitive switch assembly is shown as comprising a Bourdon tube 10 anchored at one end by means of a pressure connection member 11 to a stationary base 12. A fluid pressure to be sensed is connected to connection member 11 which opens into Bourdon tube 10, and tube 10 tends to straighten as increasing pressure is applied. Closed end 13 of Bourdon tube 10 will be seen to be translated in the directions shown by arrow 14 as the applied pressure varies. Connected to closed end 13 of the Bourdon tube is a switch-actuating member 15 which is adapted to engage the actuating rod 16 of switch 17 as decreasing pressure allows tube end 13 to move generally leftwardly. Actuating rod 16 of switch 17 moves insulating switch bar 18 against the force of compression springs 19, 20, thereby opening contacts 21, 22 and thereafter closing contacts 23, 24. Switch 17 is mounted stationary on base 12, as indicated by a mechanical ground symbol.

If the system in which the switch is to be used sometimes develops very high pressures, of, for example, 1200 p.s.i., it will be seen that Bourdon tube 10 must be made of heavy and stiff material, and therefore the amount of travel of end 13 for a given change in applied pressure will be very small. Because the motion is very small, the precise pressures at which contacts 21, 22 and 23, 24 open and close may vary considerably, as a result of, for example, slight pitting or corroding of the contacts.

In accordance with the invention, an armature 30 of magnetic material such as soft iron is rigidly connected to movable end 13 of tube 10, so that translation of the movable end of the Bourdon tube translates armature 30 between a pair of identical but oppositely-acting permanent magnets 31, 32 mounted on the stationary switch assembly base 12. When armature 30 is centered between magnets 31, 32, the magnets apply equal and opposite forces and hence no net force to armature 30. When, from the centered condition, an increasing pressure is applied to Bourdon tube 10, so that armature 30 is moved closer to magnet 32 and further away from magnet 31, magnet 32 will attract armature 30 with increased force and magnet 31 will attract armature 30 with decreased force, providing a net force which acts in opposition to the spring force of Bourdon tube 10, so that the end of tube 10 moves over a considerably greater distance for a given pressure change than it otherwise would move. Similarly, when Bourdon tube 10 moves armature 30 leftwardly in response to decreasing pressure, magnet 32 applies a decreasing force and magnet 31 an increasing force, thereby amplifying Bourdon tube movement for a given pressure change. Connected to limit motion of armature 30 is a limit stop 35, which, typically, limits armature translation to about 10 percent of the air gap between the magnets, for reasons to be made clear below in connection with FIG. 3.

Figure 2:
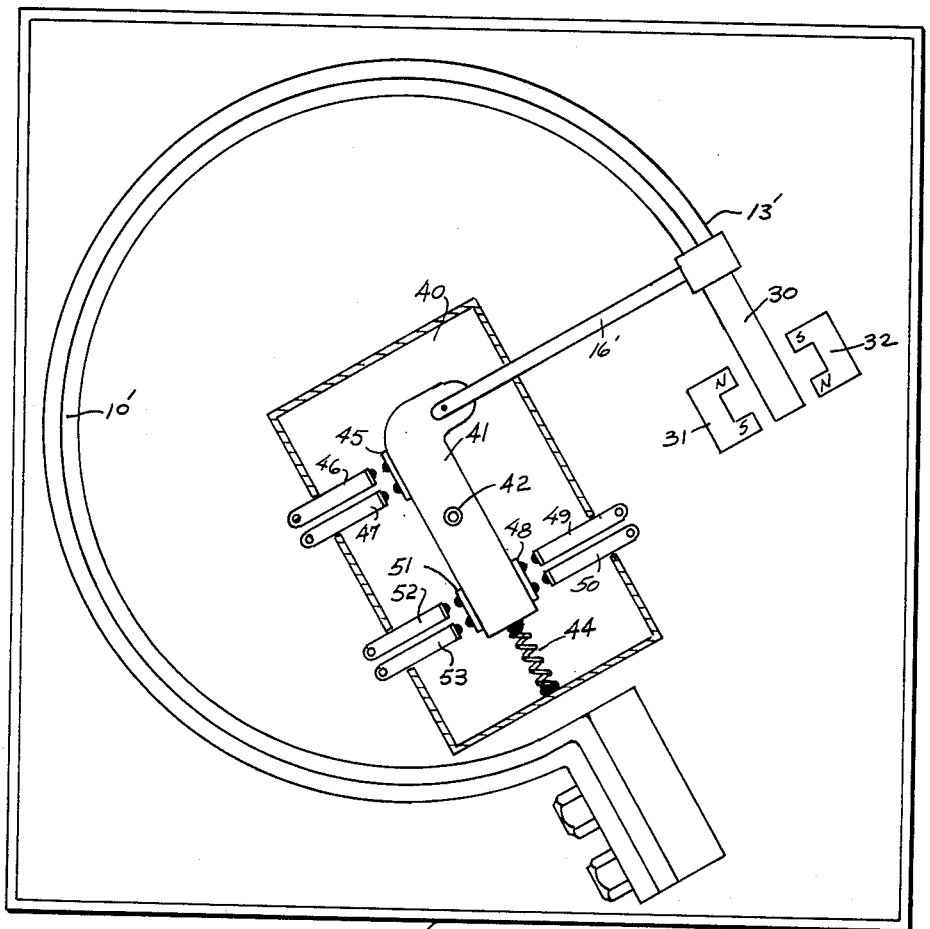
FIG. 2 is a schematic diagram of a temperature-sensing embodiment of the invention.

The temperature-responsive switch assembly of FIG. 2 is in many respects identical to the pressure-responsive device of FIG. 1, except that the Bourdon tube of FIG. 1 is replaced by a bi-metallic strip 10', the free end 13' of which is translated in response to temperature changes, thereby translating armature 30 between magnets 31 and 32. The device of FIG. 2 also is shown connected to operate a switch 40 which is provided with an overcenter mechanism to provide "snap-action." In switch 40 actuating rod 16' is connected to pivotable insulating switch armature 41 which is pivotally mounted at 42 so that reciprocation of actuating rod 16' rotates armature 41 about pivot 42. Armature 41 is shown in an unstable center position in FIG. 2 for convenience of illustration. Compression spring 44 acting on the end of armature 41 will be seen to be in a position of unstable equilibrium in the centered position shown, so that a slight pivoting of armature 41 in either direction will cause spring 44 to rotate the armature further. Rotation of armature 41 in one direction connects shorting bar 45 across contacts 46, 47 and connects shorting bar 48 across contacts 49, 50, while rotation in the opposite direction connects shorting bar 51 across contacts 52, 53.

Figure 3:
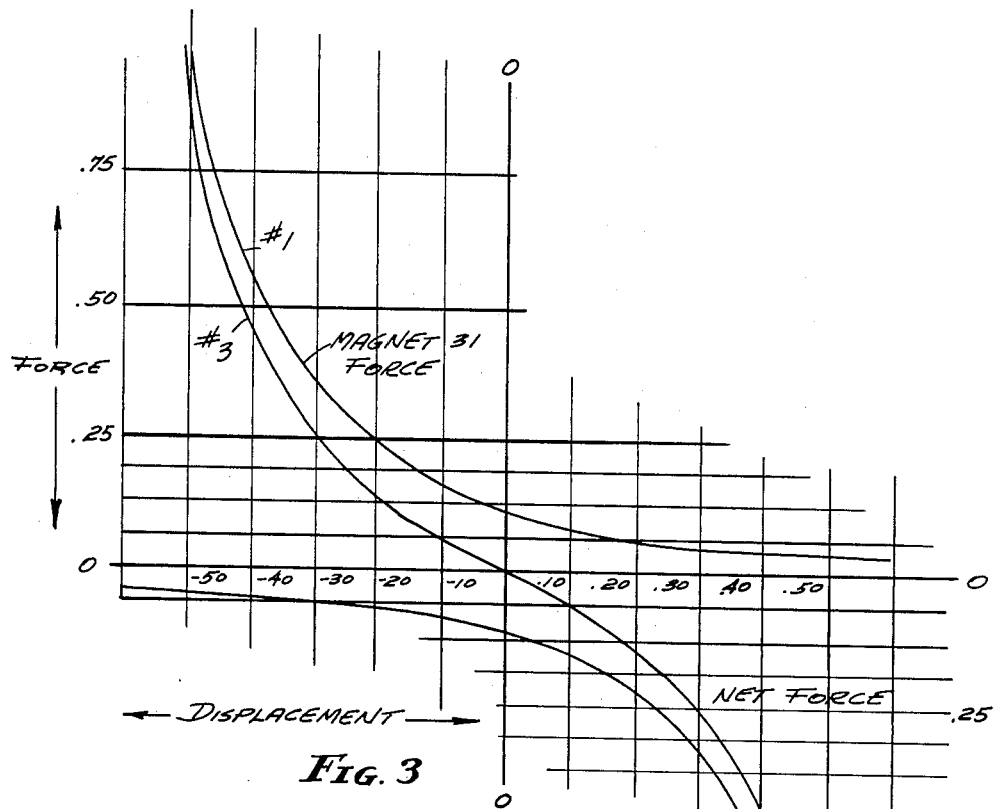
FIG. 3 is a graph useful in understanding the operation of the bi-directionally acting magnetic means of the invention.

The force with which a permanent magnet attracts a magnetic core varies inversely with the distance between the two in a magnetic circuit in which area and permeability remain constant. In FIG. 3 the forces applied to armature 30 by magnets 31 and 32 are shown plotted as curves #1 and #2, respectively, and their algebraic sum, equal to the net force applied to the armature is plotted as curve #3. It will be seen that a linear region of net force exists around the centerline of the air gap between the magnets, but that the net force becomes highly non-linear if the armature nears one or the other of the magnets. Stops such as 35 (FIG. 1) may be provided to limit armature motion to typically 10% of the air gap to maintain operation within the linear region.

A Bourdon tube or bellows connected to a bi-directional magnetic means may be seen to be equivalent to the equivalent mechanism of FIG. 5a, in which a frictionless piston, a spring, and the magnetic means are each connected to apply forces to a rod. The force $F_1$ applied by the frictionless piston represents the pressure force applied by the fluid to expand the bellows or Bourdon tube, the force $F_s$ from the spring represents the opposing force generated by the spring rate of the Bourdon tube or bellows, and the force $F_m$ represents the force applied by the magnetic circuit. Force $F_1$ will be seen to be directly proportional to applied pressure $P$, the area of the frictionless piston remaining constant, so that $$F_1 = k_1 P$$

The force $F_s$ applied by the spring will be seen to be directly proportional to $d$, the displacement of the rod from the zero position shown times $k_2$, the spring rate of the spring, so that $$F_s = k_2 d$$

and the net magnet force will be seen to be proportional to $k_3 d$, assuming that stops constrain magnet operation to the linear region of the net force curve. It will be seeen that the magnetic circuit always acts to aid forces applied by the piston, while the spring opposes the piston force, and therefore a summation of forces on the rod may be written with the signs shown as follows:

$$-F_1 + F_s - F_m = 0 \quad (1)$$

$$-k_1 P + k_2 d - k_3 d = 0 \quad (2)$$

$$d = \frac{k_1 P}{k_2 - k_3} \quad (3)$$

If the magnetic means were eliminated, it will be seen that Equation 3 could be rewritten as follows:

$$d = \frac{k_1 P}{k_2} \quad (4)$$

By comparison of Equations 3 and 4 it will be seen that provision of the magnetic means decreases the value of the denominator in Equation 3, thereby increasing the displacement obtainable with a given variation in pressure $P$. If $k_3$ is made almost equal to $k_2$, so that the denominator of Equation 3 approaches zero, it will be seen that great displacements may be obtained with minute pressure changes, so that the sensitivity of the pressure-operated switch assembly may be made very high even with a stiff, high pressure bellows or Bourdon tube. Increasing the value of $k_3$, of course, requires an increase in the magnetomotive force of the magnets used.

Understanding of some advantages of the invention also may be facilitated by reference to FIG. 5b. Line $F_{p1}$ in FIG. 5b is a plot of applied pressure force against displacement for an ordinary bellows or Bourdon tube, and line $F_{s1}$ is a corresponding curve of opposite slope representing the equal and opposite opposing force necessarily developed by the spring rate of the bellow or Bourdon tube. Now assume that a magnetic means having the characteristic of line $F_m$ is added to the Bourdon tube in accordance with the invention. The pressure force $F_1$ required to balance the system will be seen from Equations 1 and 2 to be equal to and opposite in sign from the sum of the forces applied by the magnets and the bellows spring rate. The sum force is indicated by line $F_d$ in FIG. 5b, and hence the opposite sign curve $-F_d$ in FIG. 5b represents the pressure force $F_1$ required for balance. It will be seen that in the operating region of the system between the limit stops that curve $-F_d$ has a considerably lesser slope than curve $F_{p1}$, thereby indicating that a given change in input pressure will provide a greater displacement. Curve $-F_d$ also indicates clearly how displacement of a switch actuating rod will vary with applied pressure. It will be seen that if the force of the magnetic means is increased, so as more nearly to cancel out the Bourdon tube or bellows spring rate, that the $-F_d$ curve will be made even flatter, and if the $F_m$ curve is given a slope matching that the spring rate curve $F_{s1}$, the $-F_d$ curve will have zero slope between the two limit stops, so that insignificant change in pressure will translate the switch-actuating rod from one limit to the other limit.

If the magnet force $F_m$ is made to be greater than the spring force, a hysteresis-like switching action may be obtained, causing the switch to be operated quickly in one direction upon an increase in the applied pressure to a first value but then not to be switched back until the applied pressure falls below the first value to a second value. The operation of such a system may be understood by reference to FIG. 5c, wherein the magnet net force curve $F_m$ will be seen to have a steeper slope than the spring rate curve $F_{s1}$. The resultant pressure force curve $-F_2$ will be seen to have a slope in the region between the limit stops which is opposite to its slope outside the limit stops. If pressure is increased from the value at point A on the $-F_2$ curve, the system remains against its left limit stop until the pressure very slightly exceeds the pressure corresponding to point B, at which time the system translates rapidly to the right limit and the conditions at point B' then prevail. If applied pressure then is decreased below that of point B' the switch does not immediately switch back, but remains at the right limit until applied pressure decreases very slightly below that pressure corresponding to point C, whereupon the system rapidly translates back to the steady-state conditions of point C'. It thus will be seen that a range of overlap or hysteresis exists over the range of pressures between points B and C.

Referring back to FIG. 3, it should be understood that the net force $F_m$ derived by the magnetic means may be adjusted by movement of the magnets. Moving the magnets closer together has an effect on net force which may easily be seen in FIG. 3 by moving curves #1 and #2 together, and increasing the distance between the magnets has the effect of further separating curves #1 and #2. Both magnets also may be moved together as a unit to establish the magnetic zero position at a desired relation to the switch contact closing or contact opening positions. Thus in FIG. 1 magnets 31 and 32 are each shown connected to be shifted by rotation of a respective adjusting screw 37, 38. The ends of screws 37 and 38 are rotatably attached to magnets 31, 32, and the screws are threaded through stationary pedestals 39, 39', so that rotation of the screws shifts the magnets inwardly or outwardly. As mentioned above, the distance between the magnets may be adjusted to set the switch assembly spring rate to a desired sensitivity, by shifting the magnets inwardly or outwardly in equal amounts. By shifting both magnets as a pair in the same direction, it will be seen that the switch assembly bias point may be adjusted. If desired, magnets 31 and 32 may be provided with a positioning arrangement of a type shown in FIG. 6 of my copending appl. Ser. No. 190,888 filed April 30, 1962, wherein one adjustment means operates to determine the distance between the magnets without affecting the centerline between them, and in which a second adjustment means shifts their centerline without varying the distance between them, thereby allowing separate spring-rate and set point adjustments.

Figure 4:
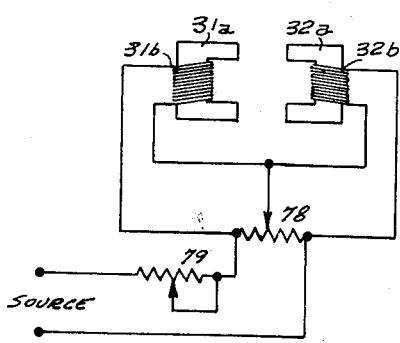
FIG. 4 is a schematic diagram illustrating an electromagnet embodiment of the invention.

While FIGS. 1 and 2 illustrate the use of permanent magnets 31, 32, it is within the scope of my invention to use electromagnets, as shown in FIG. 4. In FIG. 4 electromagnet core 31a is shown provided with a winding 31b, and electromagnet core 32a is provided with winding 32b. The windings are connected in a bridge circuit by means of potentiometer 78. It will be seen that adjustment of the wiper arm of potentiometer 78 will serve to vary or proportion the current provided to the two windings, increasing the strength of one magnet while simultaneously decreasing the strength of the other. Thus adjustment of rheostat 78 will operate to adjust the zero attraction force point between the magnets and thereby adjust the switch assembly set point. The current is applied to potentiometer 78 via rheostat 79, and hence adjustment of rheostat 79 will vary the strength of both electromagnets, thereby varying the transducer switch assembly spring rate in a manner analogous to adjustment of the distance between the magnets.

Figure 6:
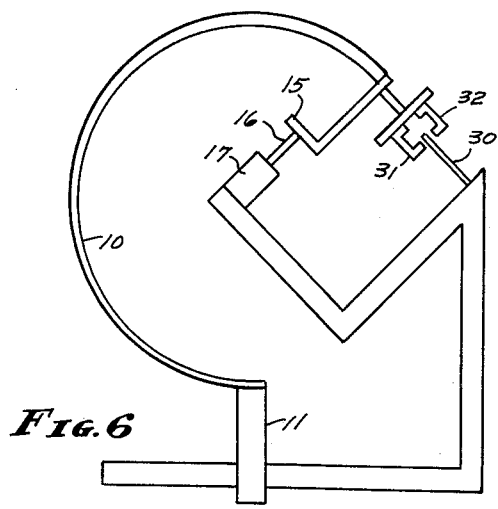
FIG. 6 is an alternative embodiment of the invention.

While the invention has been illustrated by embodiments in which the magnetic armature is mounted on the movable transducer element and in which the magnet means are mounted stationary, it should be clearly understood that one may interchange the two by a simple reversal of parts, so that the transducer end connected to actuate switch 17, i.e., end 13 of the Bourdon tube or end 13' of the bi-metal strip, is attached to move the magnets 31, 32 with respect to a stationary magnetic slug 30. The operation of such an arrangement, which is shown in FIG. 6 wherein parts similar to those of FIG. 1 are given the same numerals, will be apparent without further explanation.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A condition-operated switch assembly, comprising, in combination, a condition-to-mechanical force transducer including a spring element having a predetermined spring force, a switch-actuating member connected to said spring element, said spring element including means responsive to the condition for displacing said switch-actuating member against the spring force of said spring element; an electrical switch having a movable contact-operating member, said contact-operating member being positioned adjacent said switch-actuating member for operative engagement thereby; magnetic means operable to apply a force opposing said spring force including a magnetic core rigidly connected to said spring element, and first and second magnets, each of said magnets having first and second poles, said magnets being disposed on opposite sides of said core with the opposite poles thereof facing each other; and stop means positioned to limit movement of said magnetic core between two limit positions within the distance between said magnets, said magnets having a magnetomotive force such that the net force applied by said magnets to said core at a given displacement of said core exceeds the opposing spring force applied to said switch-actuating member at a displacement thereof corresponding to said given displacement of said core.

2. Apparatus according to claim 1 in which said condition comprises a fluid pressure and in which said force transducer comprises a Bourdon tube.

3. Apparatus according to claim 1 in which said condition comprises a fluid pressure and in which said force transducer comprises an expansible chamber pressure-to-mechanical force transducer.

4. Apparatus according to claim 1 in which said condition comprises a temperature and in which said force transducer comprises a bi-metallic thermal element.

5. Apparatus according to claim 1 in which said magnets comprise electromagnets having windings connected to a source of electrical current, and means for varying the current applied to said windings.

6. Apparatus according to claim 1 further comprising means for moving said first and second magnets in opposite directions to regulate the sensitivity and in the same direction to establish the switch assembly bias point.

7. A pressure-operated switch assembly comprising, a pressure-to-force transducer including a spring element having a predetermined spring force, a switch-actuating member connected to said spring element, said spring element including means responsive to the pressure change for displacing said switch-actuating member against the spring force of said spring element; an electrical switch having a movable contact-operating member being positioned adjacent said switch-actuating member for operative engagement thereby; magnetic means operable to apply a force opposing said spring force, said magnetic means including a magnetic core rigidly connected to said spring element, and first and second magnets, each of said magnets having first and second poles, said magnets being disposed on opposite sides of said core with the unlike poles thereof facing each other; and stop means positioned to limit movement of said magnetic core between said magnets to less than 20% of the distance between said magnets, said magnets having a magnetomotive force greater than said spring force to provide a hysteresis-like switching action causing said switch-actuating member to be operated quickly in one direction upon an increase in the applied pressure to a first value but not be switched back until the applied pressure falls below the first value to a second value.

References Cited by the Examiner
UNITED STATES PATENTS

| | | | |
|---|---|---|---|
| 1,782,458 | 11/30 | Brennen | 200—153 |
| 1,821,853 | 9/31 | Short | 200—81.8 |
| 1,976,954 | 10/34 | Mantz | 200—67 |
| 2,175,721 | 10/39 | Taylor. | |
| 2,204,792 | 6/40 | Davis. | |
| 2,219,441 | 10/40 | Carnes. | |
| 2,225,080 | 12/40 | Newman. | |
| 2,300,895 | 11/42 | Hopkins | 200—81.8 |
| 2,564,120 | 8/51 | McLean | 200—122.01 |
| 2,727,964 | 12/55 | Krenke | 200—16 |
| 2,874,924 | 2/59 | Good | 236—48 |

FOREIGN PATENTS

| | | |
|---|---|---|
| 23,130 | 5/18 | Denmark. |

BERNARD A. GILHEANY, *Primary Examiner.*